United States Patent [19]
Credeur

[11] Patent Number: 5,819,686
[45] Date of Patent: Oct. 13, 1998

[54] ANIMAL FEEDER

[76] Inventor: Patrick Credeur, 241 Kidder Rd., Carencro, La. 70520

[21] Appl. No.: 872,868

[22] Filed: Jun. 11, 1997

[51] Int. Cl.⁶ .......................... A01K 5/00; A01K 39/04; A01K 7/04
[52] U.S. Cl. .......................................... 119/51.5; 119/52.1
[58] Field of Search ................ 119/51.01, 51.5, 119/52.1, 51.11, 53, 72, 74, 78

[56] References Cited

U.S. PATENT DOCUMENTS

| | | | |
|---|---|---|---|
| 2,583,218 | 1/1952 | Lambeth | 119/51.5 |
| 2,614,532 | 10/1952 | Steel | 119/78 |
| 3,371,652 | 3/1968 | Louks et al. | 119/51.11 |
| 3,527,191 | 9/1970 | Kawecki | 119/51.11 |
| 3,547,081 | 12/1970 | Geerlings | 119/51.11 |
| 3,670,702 | 6/1972 | Cory et al. | 119/52 R |
| 3,782,332 | 1/1974 | Depenthal et al. | 119/51.13 |
| 4,180,014 | 12/1979 | Mathews | 119/52 R |
| 4,182,273 | 1/1980 | Peterson | 119/51.5 |
| 4,248,175 | 2/1981 | Navarro | 119/51.12 |
| 4,256,054 | 3/1981 | Hitchcock | 119/51.11 |
| 4,329,941 | 5/1982 | Niki | 119/72.5 |
| 4,346,672 | 8/1982 | Niki | 119/72.5 |
| 4,421,060 | 12/1983 | Frush et al. | 119/72.5 |
| 4,505,228 | 3/1985 | Scott | 119/62 |
| 4,606,373 | 8/1986 | Noland | 137/426 |
| 4,653,432 | 3/1987 | Smeds | 119/71 |
| 4,688,520 | 8/1987 | Parks | 119/51.11 |
| 4,782,790 | 11/1988 | Batson | 119/51.11 |
| 4,907,539 | 3/1990 | Abulhasan | 119/52.1 |
| 4,947,796 | 8/1990 | Robinette | 119/51.5 |
| 4,953,506 | 9/1990 | Sanders | 119/61 |
| 4,962,730 | 10/1990 | Schafer | 119/73 |
| 5,335,624 | 8/1994 | Baxter et al. | 119/51.5 |
| 5,404,838 | 4/1995 | Khan | 119/52 |
| 5,467,735 | 11/1995 | Chrisco | 119/51.5 |

Primary Examiner—Robert P. Swiatek
Assistant Examiner—James S. Bergin
Attorney, Agent, or Firm—Domingue, Delaune & Waddell

[57] ABSTRACT

The invention herein described allows for an operator to fill a hopper with an animal food. The hopper contains an inclined chute that will funnel the food to a food trough platform and in turn to an extension member. The food on the platform is protected from the elements via an encasement as well as the swinging door. The animal may pivot the door open in order to reach the food. The hopper is disposed within a basin filled with a fluid such as water. The hopper will be surrounded by the fluid on all four sides. The food trough platform is raised above the water body in a moat like fashion. The fluid level within the basin is controlled via a water feeder control valve member so that a fresh water supply is automatically controlled within the basin. The water also serves to keep insects from the food. Therefore, an animal is allowed a fresh food and water supply for an extended amount of time.

10 Claims, 3 Drawing Sheets

ANIMAL FEEDER

BACKGROUND OF THE INVENTION

This invention relates to an apparatus for feeding animals. More particularly, but not by way of limitation, this invention relates to a feeding device for animals that automatically provides food and water for the animal's consumption while at the same time protects the food from contamination.

Most animals require a daily routine of food and water in order to maintain their proper physical condition. The daily feedings may prove to be a hardship for those owners that require travel as part of their business. Alternatively, those owners who vacation to destinations that make taking their pets either unreasonable or impossible, also must make arrangements for the care of their animals.

Prior art devices have been introduced that seek to automatically feed animals for prolonged periods of absence by an animal owner to enable continuous supply of nourishment. Due to the nature of many types of animal food, the shelf life may be significant thereby allowing use of animal food with these automatic animal feeders. Dry pet food is commonly used by pet owners since the food maintains its shelf life for extended periods of time. Thus, this type of dry pet food is ideally suited for long term feeding. However, the prior art designs allow the pet food to become contaminated with insects and insect dropping. Once the food and/or water become contaminated, the animals will no longer eat the food which in turn provides for health problems for the animals as well as waste of the animal food.

Therefore, there is a need for an apparatus that will mechanically provide animal food and water for extended periods of time. There is also a need for an apparatus that will prevent the food and water from becoming contaminated by insects. There is also a need for a device that automatically fills a feeding trough and water trough.

SUMMARY OF THE INVENTION

An apparatus for feeding an animal with an animal food is disclosed. Generally, the apparatus comprises a food supply hopper containing the animal food, with the food supply hopper having an outlet formed therein. Also included will be a reservoir means, disposed about the second end of the food supply hopper, for containing a water supply and encircling the food supply hopper with the water supply. The apparatus also comprises a food trough, operatively associated with the outlet for dispensing the animal food. In one embodiment, the food trough includes an extension member, and wherein the extension member extends above the water supply and terminates at a position beyond the first side of the reservoir basin.

In the preferred embodiment, the reservoir means comprises a reservoir basin containing the water supply, and wherein the second end of the food supply hopper is disposed therein. The reservoir means also contains a water supply source operatively associated with the reservoir basin and a float member, operatively associated with the reservoir basin, that measures the level of the water supply. The reservoir means further includes a valve means, operatively associated with the float member, for allowing the entry of the water supply from the water supply source once the water supply reaches a predetermined level.

In one embodiment, the apparatus also contains a weather guard encasement adapted to the outlet so that the weather guard encasement covers the food trough. The apparatus may also include a door operatively associated with the weather guard encasement, and wherein the door is hinged to the weather guard encasement so that the animal is allowed access to the animal food contained on the food trough. In the preferred embodiment, an inclined chute member is contained within the food supply hopper so that the inclined chute member funnels the animal food contained within the food supply hopper to the food trough.

An advantage of the present invention includes providing an improved animal feeder. Another advantage includes having an apparatus that protects and preserves the animal food and water. Another advantage includes allowing the animals easy access to the food and water. Yet another advantage is that the device allows for efficient storage of the food which prevents crawling insects such as ants, roaches, etc. from entering and contaminating the food supply.

Another advantage is the device provides a continuous supply of fresh water for drinking which in turn will automatically fill and maintain its pre-determined water level in the water supply reservoir. Another advantage includes the water may be supplied by a common source such as a garden hose attachment. Yet another advantage is the water within the reservoir basin aids in a water weighted stabilizer base to prevent the unit from tipping.

Still yet another advantage is the food storage hopper is centrally located in the reservoir basin to further stabilize the feeder and enhance its free standing capability. Another advantage is that the food trough is designed where food is readily available and protected from the elements of the weather. Other advantages will be apparent from a reading of the detailed description of the invention.

DETAILED DESCRIPTION OF THE PREFERRED EMBODIMENTS

Figure 1:
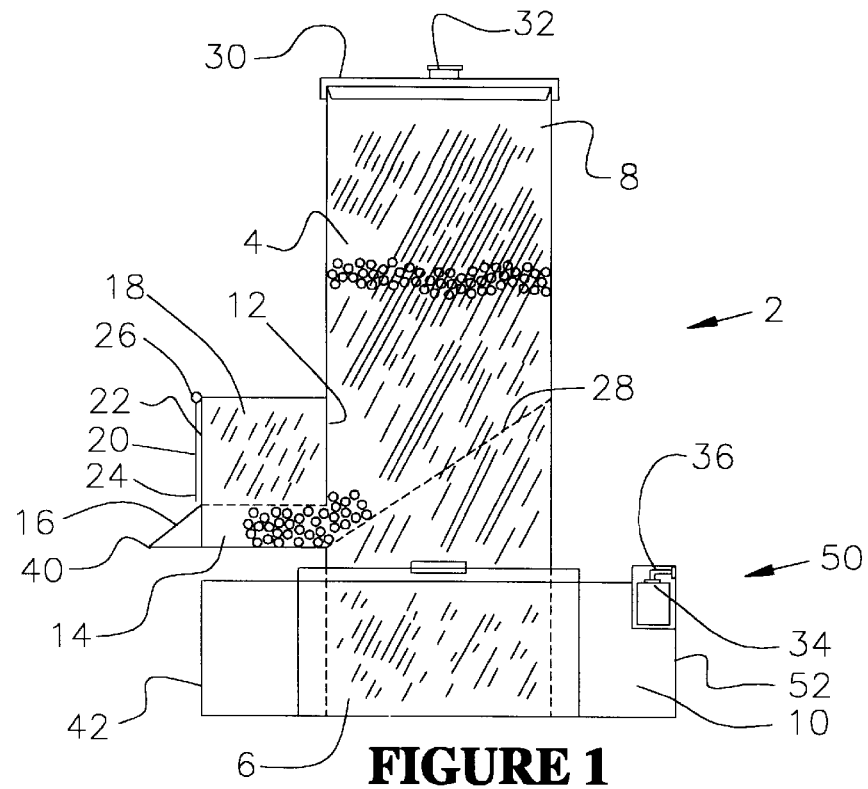
FIG. 1 is a first side perspective view of the preferred embodiment of the present invention.

Referring now to FIG. 1, a first side perspective view of the preferred embodiment of the present invention 2 will now be described. Generally, the apparatus will comprise a food supply hopper 4 that is rectangular in shape. The hopper 4 has a first end 6 and a first end 6. The apparatus 2 further includes a reservoir basin 10, with the reservoir basin also being generally rectangular in shape. The reservoir basin 10 is configured so as to mount the second end 8 of the hopper 4 therein as depicted in FIG. 1. The reservoir basin 10 will contain a supply of water which in turn allows the forming of a moat like structure about the hopper 4.

The hopper 4 will also have associated therewith an outlet 12, with the outlet 12 having adapted thereto a food trough platform 14. The food trough platform 14 will in turn extend to a food trough extension 16. The platform 14 and extension 16 provide a mechanism by which the food stored within the hopper 4 may be dispensed to the animal, as will be more fully explained later in the application. The outlet 12 will have operatively associated therewith the weather guard encasement 18, with the encasement 18 serving to cover the food trough platform 14 from the elements including rain, humidity, etc. Thus, the encasement 18 is generally a three-sided structure. The encasement 18 will be operatively associated with the door member 20. The door member 20 is a plate like structure that has a first end 22 and a second end 24, with the first end 22 being hinged to the encasement 18 so as to allow the door member 20 to swing open about the hinge 26. Thus, the animal may enter his nose and mouth into the encasement 18 since the door 20 will swing open.

The hopper 4 will also contain therein an inclined chute 28. The inclined chute 28 will allow for placement of the animal food into the hopper 4, and funnel the animal food into the outlet 12 for delivery into the food trough 14. The hopper 4 will also contain the lid 30 that is associated with the second end 8. As shown in FIG. 1, the lid 30 may have a handle 32 for lifting by the operator.

The apparatus will also have associated therewith the float member 34 that is operatively associated with the reservoir basin 10. The float member 34 is used in order to determine the water level within the basin 10. The float member 34 will be operatively associated with the valve means 36 for allowing the entry of a water supply into the basin 10. The water supply may, for instance, be a garden hose that is made-up with a typical residential water source. The float member 34 and valve means 36 will be explained in greater detail with reference to FIGS. 6 and 7 later in the application. In the preferred embodiment, the basin 10 contains an inner support housing 38 that the hopper 4 may be placed therein for added stability and structure support.

Figure 2:
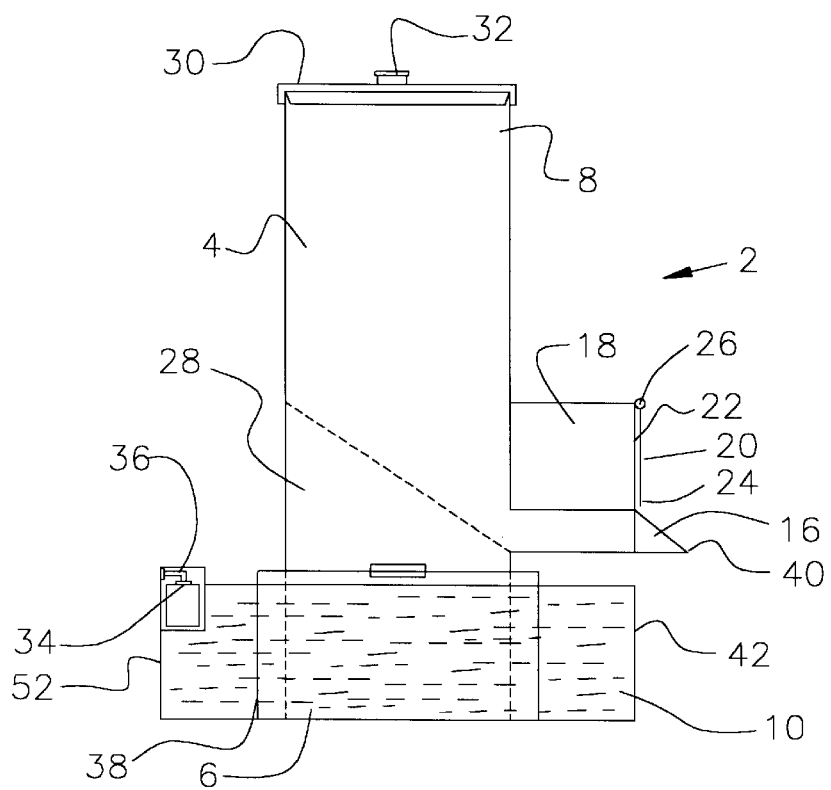
FIG. 2 is a second side perspective view of the invention of FIG. 1 taken from a 180 degree rotated position.

Referring now to FIG. 2, a second side perspective view of the invention of FIG. 1 taken from a 180 degree rotated position will now be described. Thus, the hopper 4 is disposed within the reservoir basin 10 and in particular within the cavity of the support housing 38. The view of FIG. 2 also illustrates the float member 34 and valve means 36 within the reservoir basin 10. It should be noted that like numbers in the various figures refer to like components.

In both FIG. 1 and FIG. 2, the food trough platform 14 is disposed at a position above the water of the basin 10. Further, the extension 16 terminates at a position beyond the first side of the reservoir basin 10. In other words, the end 40 extends past the side 42. This physical position is important since it allows the platform 14 that contains the food to be above the water, and at the same, the end 40 actually extends beyond the side 42 of the basin 10.

Figure 3:
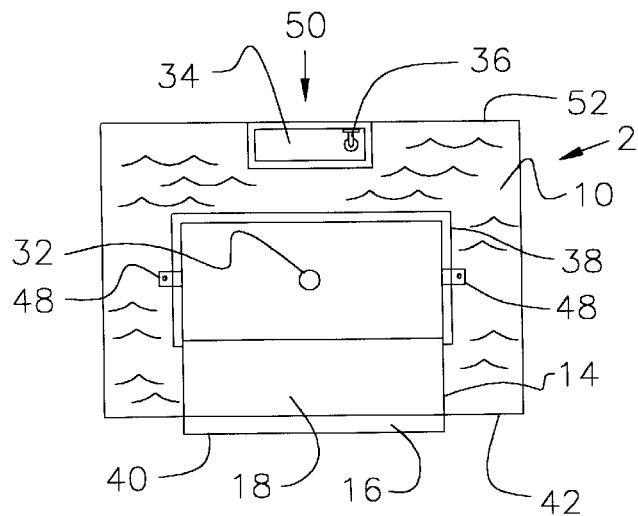
FIG. 3 is a top plan view of the invention of FIG. 1 depicting the food supply hopper within the reservoir basin.

Referring now to FIG. 3, a top plan view generally depicting the moat effect of the basin 10 coupled with the bridge effect of the food trough platform 14 of the apparatus 2 is illustrated. Thus, encasment 18 will cover the trough platform 14 from the elements including the rain. Also, the end 40 of the extension 16 extends past the side 42.

Figure 4:
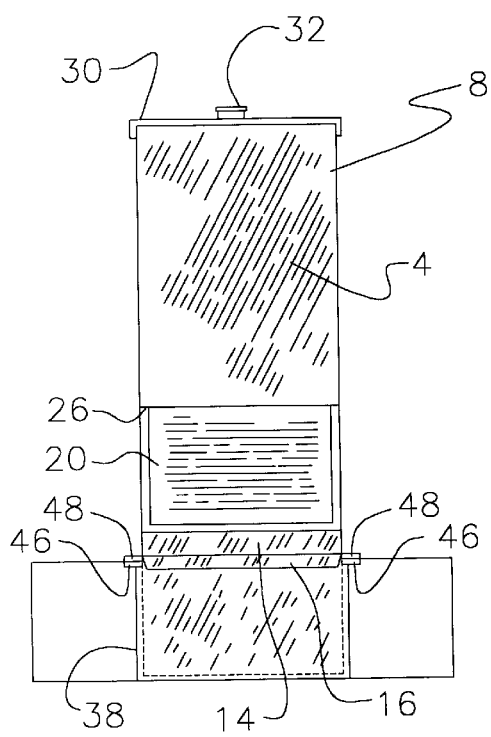
FIG. 4 is a front perspective view of the invention illustrated in FIG. 1.
Figure 5:
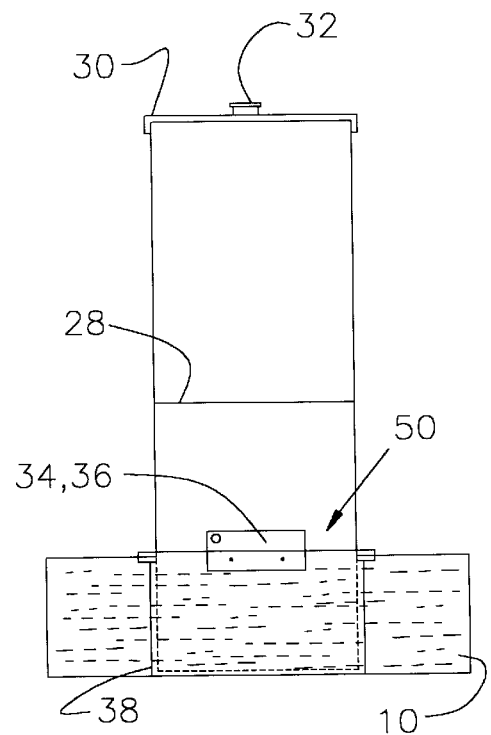
FIG. 5 is a back perspective view of the invention illustrated in FIG. 1.

With reference to FIG. 4, a front view of the apparatus 2 is illustrated. Therefore, the swinging door 20 is closed, with the food trough platform 14 and the extension 16 stretching therefrom. The FIG. 4 also illustrates the water basin pad eye 46 and a cooperating food hopper base pad eye 48 that may be included so that the basin 10 and the hopper 4 may be better secured together for structural stability. The FIG. 5 has also been included in order to depict a back perspective view of the invention illustrated in FIG. 1. The view of FIG. 5 also depicts the float member 34 as well as the valve means 36 which will be described in more detail hereinafter.

Figure 6:
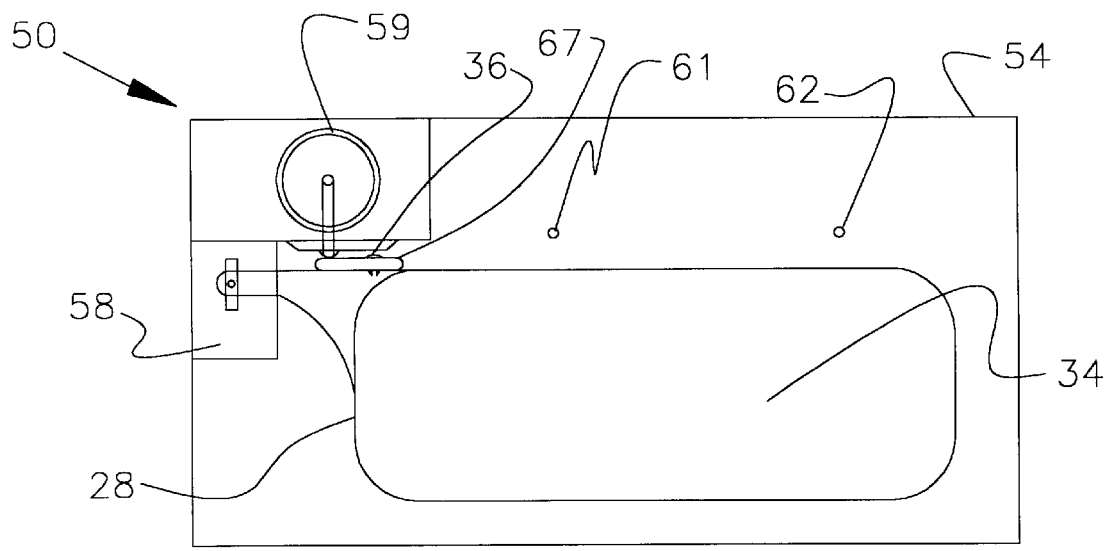
FIG. 6 is an exploded front view of the float member and valve means of the present invention.

The FIG. 6 is an exploded front view of the water feeder control valve means 50 for automatically filling the basin 10 with a fluid, the water feeder control valve means comprising the float member 34 and the valve means 36 along with the various components. The water feeder control valve means 50 is mounted on the rear wall 52 of the basin 10. These types of water feeder control valve means are well known in the art and are commercially available from Miller Manufacturing Co. under the trademark "Trough-O-Matic".

The water feeder control valve means 50 has a housing 54 that is mounted on the rear wall 52 of the basin. Generally, the housing 54 is mounted onto the wall 52 via insertion of bolts 56 through the openings 61, 62 which will be aligned with similar openings in the wall 52. According to the teachings of the present invention, by connecting a common garden hose to the thread means 59 a water supply is associated with the basin 10. Thus, a fresh water supply may be left on by the operator in order to supply fresh water to the basin 10. The water level is mechanically regulated by the action of the float 34. The float 34 is mounted to bracket float arms 58 via a pivot point pin 60. The float 34 will have operatively associated therewith the seal member 67 (preferably made of rubber) that cooperate with the valve housing seat 64. The valve housing seat 64 is connected to the water supply inlet 66 via the valve arm 68.

Figure 7:
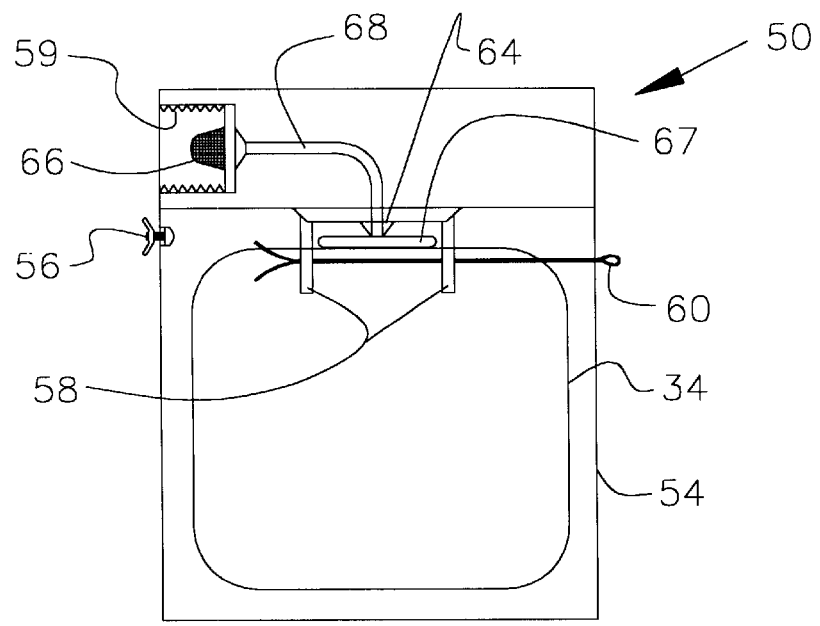
FIG. 7 is an exploded side view of the float member and valve means illustrated in FIG. 6.

The operation of the water feeder control valve means 50 may be understood with reference to FIG. 7. Thus, as the water level in the basin 10 decreases, the float 34 will lower correspondingly. As the float 34 lowers, the seal member 67 will lower thereby allowing the valve housing seat 64 to become unseated. Once the seat 64 becomes unseated, the valve in effect opens thereby allowing water from the water supply (i.e. the garden hose) to enter the housing 54 and out into the basin 10. The water level within the basin 10 will in turn rise. The float member 34 will then again cause the seal member 67 to rise and push against the valve housing seat 64 so that the valve now closes and the inflow of water is terminated. As the animal drinks the water, or in the case of evaporation or spillage, when the water level decreases, the same sequence repeats itself in order to automatically fill the basin with a fluid.

Thus, the invention herein described allows for an operator to fill a hopper 4 with animal food. The inclined chute 28 will funnel the food to a food trough platform 14 and in turn to the extension 16. The food is protected via an encasement 18 as well as the swinging door 20. The animal may pivot the door 20 open in order to reach the food.

The hopper 4 is disposed within a basin, with the hopper 4 being surrounded by water on all four sides. The food trough platform 14 is raised above a water body in a moat like fashion. The fluid level within the basin is controlled via a water feeder control valve means 50 so that a fresh water supply is captured within the basin. The water also serves to keep insects from the food. Therefore, an animal is allowed a fresh food and water supply for an extended amount of time.

Changes and modifications in the specifically described embodiments can be carried out without departing from the scope of the invention which is intended to be limited only by the scope of the appended claims.

I claim:

1. An apparatus for feeding an animal with an animal food comprising:
   a food supply hopper containing the animal food said food supply hopper having a first end and a second end, and wherein said food supply hopper has formed therein an outlet;

a reservoir means, disposed about the second end of said food supply hopper, for containing a water supply and encircling the food supply hopper with said water supply and wherein said reservoir means comprises a reservoir basin open to the atmosphere containing the water supply, and wherein the second end of said food supply hopper is disposed therein;

a food trough, operatively associated with said outlet for dispensing the animal food wherein said food trough includes an extension member extending outward from said hopper and parallel with the ground, and wherein said extension member extends above the water supply and terminates at a position beyond the first side of said reservoir basin;

a water supply source operatively associated with said reservoir basin;

a float member, operatively associated with said reservoir basin, for measuring the level of the water supply;

valve means, operatively associated with said float member, for allowing the entry of the water supply from the water supply source once the water supply reaches a predetermined level.

2. The apparatus of claim 1 wherein said reservoir means comprises:

a reservoir basin containing the water supply, and wherein the second end of said food supply hopper is disposed therein;

a water supply source operatively associated with reservoir basin;

a float member, operatively associated with said reservoir basin, for measuring the level of the water supply;

valve means, operatively associated with said float member, for allowing the entry of the water supply from the water supply source once the water supply reaches a predetermined level.

3. The apparatus of claim 1 further comprising:

a weather guard encasement adapted to said outlet, and wherein said weather guard encasement covers said food trough.

4. The apparatus of claim 3 further comprising:

a door operatively associated with said weather guard encasement, and wherein said door is hinged to said weather guard encasement so that the animal is allowed access to the animal food contained in said food trough.

5. The apparatus of claim 4 further comprising:

an inclined chute member contained within said food supply hopper, and wherein said inclined chute member funnels the animal food contained within said food supply hopper to said food trough.

6. A device for supplying an animal food to an animal:

a reservoir basin containing a water supply that is open to the atmosphere, said reservoir basin containing a first side;

a food supply hopper having a first end and a second end, said food supply hopper containing the animal food, and wherein said second end of said food supply hopper is disposed within said reservoir basin so that said water supply encircles said food supply hopper and wherein said food supply hopper contains an outlet formed therein;

a food trough attached to said outlet of said food supply hopper and wherein said food trough includes an extension member extending outward from said hopper and parallel with ground, and wherein said extension member extends above the water supply and terminates at a position beyond the first side of said reservoir basin.

7. The device of claim 6 further comprising:

a weather guard encasment adapted to said outlet, and wherein said weather guard encasment covers said food trough.

8. The device of claim 7 further comprising:

a door operatively associated with said weather guard encasment, and wherein said door is hinged to said weather guard encasement so that the animal is allowed access to the animal food contained on said food trough.

9. The device of claim 8 further comprising:

a water supply source operatively associated with said reservoir basin;

a float member, operatively associated with said reservoir basin, adapted to measure the level of the water supply within said reservoir basin;

valve means, operatively associated with said float member, for allowing the entry of the water supply from the water supply source once the water supply reaches a predetermined level.

10. The device of claim 9 further comprising:

an inclined chute member contained within said food supply hopper, and wherein said inclined chute member funnels the animal food contained within said food supply hopper to said food trough.

* * * * *